Oct. 11, 1966  P. D. J. DICKS ET AL  3,278,656
METHOD OF MOULDING PLASTIC CONTAINERS BY ELECTROSTATIC DEPOSITION
Filed July 1, 1963

INVENTORS
WILLIAM M. HILL
PETER D. J. DICKS

BY: Fetherstonhaugh & Co
ATTORNEYS 3,278,656
METHOD OF MOULDING PLASTIC CONTAINERS
BY ELECTROSTATIC DEPOSITION
Peter D. J. Dicks, 138 Vero Beach Blvd., Weston, Ontario, Canada, and William M. Hill, The Gore, Ayr, Ontario, Canada
Filed July 1, 1963, Ser. No. 291,617
2 Claims. (Cl. 264—24)

This invention relates to a method of manufacturing a plastic article by employing an electrostatic powder spraying process.

In the manufacture of plastic articles such as containers and trays, it is common to employ injection moulding techniques and equipment. A major drawback of the injection moulding process is the relatively high capital outlay required to purchase injection moulding machinery and the precision dies required to obtain a high quality product.

We have made an important and worthwhile discovery in that plastic articles such as trays and containers can be successfully produced by employing an electrostatic powder spraying process. This process can be successfully carried out using normal commercially available plastics which have flow properties that will produce a solid body on curing without pressure, such as polythenes, polyamides and polyvinyl chloride. The capital outlay required to procure one of these units together with the necessary dies is considerably less than that required for injection moulding equipment to perform the same function. Furthermore, the simplicity of the spraying process reduces the maintenance and running costs of the operation to a minimum.

A further feature of the invention is that two plastics having different characteristics may be laminated by applying a thin coating of a first plastic and then a further coating of a second plastic. In this manner it is possible to produce robust plastic items comprising a thick layer of inexpensive plastic lined with a thin layer of a more expensive plastic having some particularly desirable characteristic. It is essential in the lamination of plastic as described above that the melt flow and shrink characteristics are similar. This process may be used to laminate the various densities of polythene thereby combining the properties of the various densities, also polypropylene may be laminated with any of the polyethylenes.

The elestrostatic powder spraying process has been recently developed as a method of coating an object with an even layer thickness of plastic material. This process has proved very successful in the field of plastic coatings, and produces a high quality finish. A full account of the operation of the electrostatic powder spraying unit in the field of plastic coatings is given on page 223 of the May 1962, volume 2, number 5, edition of International Plastics Engineering, published by Iliffe Industrial Publications Limited, London, England.

According to our invention, we provide a method of moulding plastic containers from an insulating plastic material that will accept an electrostatic charge and that can be cured as a body in powdered form by the application of heat without pressure comprising the steps of, forming a mould having a cavity that is adapted to attract an electrostatically charged particle with the contour of the container to be moulded, powdering the plastic material, coating a layer of said plastic material on said mould cavity by electrostatically charging the particles of plastic material and releasing them in the region of the mould cavity, curing said layer of powdered material to form a moulded article and after cooling parting said moulded article from said cavity.

The invention will be clearly understood after reference to the following detailed specification read in conjunction with the drawings.

Figure 1:
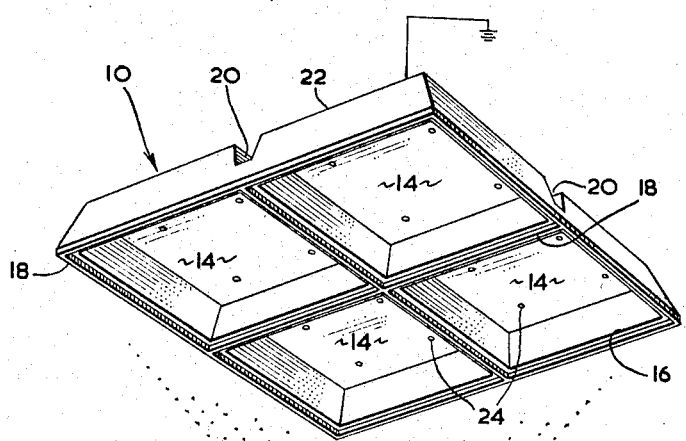
FIGURE 1 is a perspective view showing the relative positions of the mould and spray gun during the spraying operation.
Figure 2:
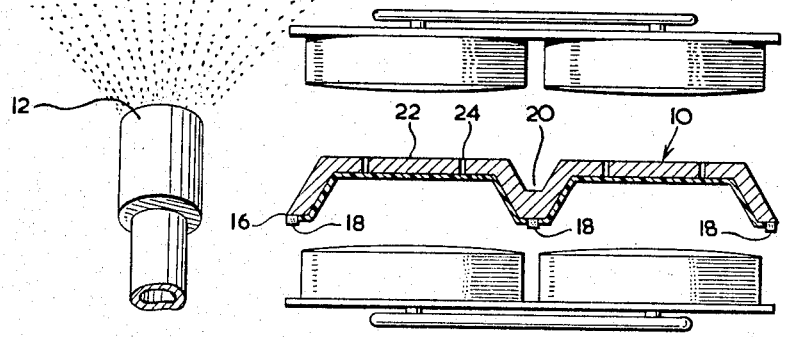
FIGURE 2 is a sectional view through the mould and container showing the curing process.
Figure 3:
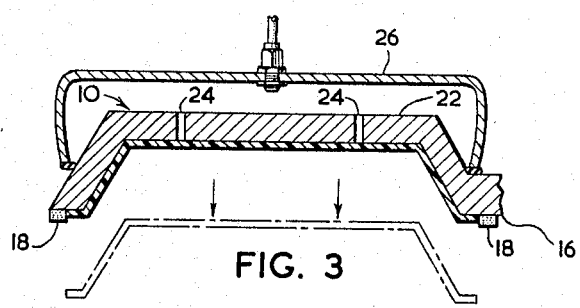
FIGURE 3 is a sectional view showing the article ejection process.

Referring to the drawings, FIGURES 1, 2 and 3 represent the three stages of production according to the present invention.

As shown in FIGURE 1, a mould 10, preferably of aluminum or copper, is located directly above an electrostatic powder spray gun 12 and grounded by means of grounding wire 11. A number of depressions 14, in this case four, are provided in the downwardly facing surface 16 of said mould 10, each of said depressions 14 having an outline corresponding to the contour of the article to be produced. Masking material 18, such as a ceramic or silicon rubber insulator, is provided along the boundary edges of each depression such that the mould is divided into individual units from a point of view of electrostatic powder spraying. Recesses 20 corresponding to the boundary edges of said depressions 14 are provided in the upper surface 22 of said mould. Air holes 24 pass through said upper surface 22 and open into the depressions 14. A thin coating of a release agent such as silicon applied to the surfaces of the depressions 14 prevents the plastic from bonding to the mould. In use, electrostatic powder spray gun 12 sprays a cloud of electrically charged powder particles towards the downward facing surface 16 of the mould. The spray pressure being in the region of 1.5 p.s.i. The powder particles, as a result of their carrying an electrical charge, are attracted to the mould and fill the depression to give an even layer thickness.

The layer thickness which generally ranges from .005" to .050" can be controlled by varying the electrical charge carried by the particles. This, however, is relatively inefficient and consequently an increased thickness is required, it is more common to preheat the moulding die. Consistent layer thickness within the depressions is obtained by permitting any excess powder to fall away from the mould, rather than collect in the base or on an edge as would be the case if the mould were facing upward or suspended from one end. By providing insulation of sufficient thickness, proportional to the charge carried by the powder particles, powder will not adhere to the boundary edges of the depression.

The powder will remain firmly in position for a considerable period. This, however, should not be necessary as it is intended that the mould will pass on to the curing stage within a short period of time after the spraying process. In the curing stage, as shown in FIGURE 2, a number of infra-red heater units are positioned so as to radiate onto the surface of the powder contained within the depressions 14 and onto the upper surface 22 of the mould to heat the powder to the fusion temperature of the plastic.

The moulded article is cooled by means of an air blast onto the surface of the article or by immersing the moulded article and mould in water.

The fourth stage of the process involves the removal of the fused article from the depression 14. As shown in FIGURE 3 an outer cover 26 fits over the upper surface of said mould and provides an air tight enclosure into which air is forced under pressure. As the air pressure builds up the air acting through the air holes 24 will force the container out of the depression 14.

As can be clearly seen, this is a relatively simple operation when compared with the operation according to injection moulding techniques. It will, of course, be obvious that the four-stage process can be linked together within the structure of an automatic machine.

What we claim as our invention is:

1. A method of moulding plastic containers from an insulating plastic material that will accept an electrostatic charge and that can be cured as a body in powdered form by the application of heat without pressure, comprising the steps of forming a mould having a moulding surface that is adapted to attract an electrostatically charged particle with a contour of the container to be moulded, the marginal area at the edge of said moulding surface being of an insulating material to reject charged particles, powdering the plastic material, coating a layer of said plastic material on said mould moulding surface by electrostatically charging the particles of plastic material and spraying from underneath said moulding surface on to the mould moulding surface, curing said layer of powdered material to form a moulded article and, after cooling, parting said moulded article from said moulding surface.

2. A method of moulding plastic containers from plastic materials that will accept an electrostatic charge and that can be cured in powder form by the application of heat without pressure, comprising the steps of, forming a mould having a moulding surface that is adapted to attract an electrostatically charged particle with a contour of the container to be moulded, the marginal area at the edge of said moulding surface being of an insulating material to reject charged particles, powdering a first plastic material, coating a layer of said first plastic material on said mould moulding surface by electrostatically charging said powdered first plastic material and spraying it from underneath said moulding surface on to the mould moulding surface, powdering a second plastic material, said second plastic material having similar melt flow and shrink characteristics to said first plastic material, coating a layer of said second plastic material over said layer of first plastic material by electrostatically charging the powdered second plastic material and spraying it from underneath said moulding surface on to the first plastic material, curing said layers of said first plastic material and said second plastic material to form a moulded article and, after cooling, parting said moulded article from said moulding surface.

References Cited by the Examiner
UNITED STATES PATENTS

| | | | |
|---|---|---|---|
| 2,128,327 | 4/1938 | Russell et al. | 117—17 |
| 2,451,934 | 10/1948 | Evans | 264—24 |
| 2,663,652 | 12/1953 | Railing | 117—17 |
| 2,754,729 | 7/1958 | Emery | 264—335 |
| 2,910,351 | 10/1959 | Szpak et al. | 117—17.5 XR |
| 2,966,429 | 12/1960 | Darrel et al. | 117—175.5 XR |
| 3,187,381 | 6/1965 | Britten | 264—24 |

ALEXANDER H. BRODMERKEL, *Primary Examiner.*

J. H. WOO, *Assistant Examiner.*